(12) United States Patent
Teflian (10) Patent No.: US 10,284,928 B2
(45) Date of Patent: May 7, 2019

(54) SYSTEM AND METHOD OF ANALYZING CMTS DATA STREAMS

(71) Applicant: CHARTER COMMUNICATIONS OPERATING, LLC, St. Louis, MO (US)

(72) Inventor: Mark Teflian, Parker, CO (US)

(73) Assignee: CHARTER COMMUNICATIONS OPERATING, LLC, St. Louis, MO (US)

(*) Notice: Subject to any disclaimer, the term of this patent is extended or adjusted under 35 U.S.C. 154(b) by 0 days.

(21) Appl. No.: 15/426,017

(22) Filed: Feb. 6, 2017

(65) Prior Publication Data

US 2017/0230211 A1 Aug. 10, 2017

Related U.S. Application Data

(60) Provisional application No. 62/291,454, filed on Feb. 4, 2016.

(51) Int. Cl.
| | |
|---|---|
| *H04B 1/38* | (2015.01) |
| *H04B 15/00* | (2006.01) |
| *H04B 10/60* | (2013.01) |
| *H04B 3/46* | (2015.01) |
| *H04Q 9/02* | (2006.01) |
| *H04B 10/69* | (2013.01) |

(52) U.S. Cl.
CPC .......... *H04Q 9/02* (2013.01); *H04B 1/38* (2013.01); *H04B 3/46* (2013.01); *H04B 10/60* (2013.01); *H04B 10/69* (2013.01); *H04B 10/697* (2013.01); *H04B 15/00* (2013.01); *H04Q 2209/30* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,931,018 | B1* | 8/2005 | Fisher | H04L 45/04 370/401 |
| 7,471,771 | B2* | 12/2008 | Wahl | H04L 12/2878 370/241 |
| 8,649,421 | B2* | 2/2014 | Renken | H04N 7/17309 375/222 |
| 9,729,257 | B2* | 8/2017 | Williams | H04H 20/78 |
| 2007/0058641 | A1* | 3/2007 | Cicchetti | H04L 49/357 370/400 |
| 2007/0297748 | A1* | 12/2007 | West | H04N 7/22 385/147 |
| 2009/0052440 | A1* | 2/2009 | Pfeffer | H04L 12/2801 370/352 |
| 2012/0096113 | A1* | 4/2012 | Ladd | G06F 11/2268 709/217 |
| 2012/0213259 | A1* | 8/2012 | Renken | H04N 7/17309 375/222 |

(Continued)

*Primary Examiner* — Linda Wong
(74) *Attorney, Agent, or Firm* — Meagher Emanuel Laks Goldberg & Liao, LLP (57) ABSTRACT

Systems, methods, architectures, mechanisms or apparatus for analyzing cable modem termination system (CMTS) streams by correlating anomalies found in full spectrum CMTS upstream data to changes in cable modem operational settings to identify and correct network fault conditions, model CMTS behavior, improve network performance and the like.

18 Claims, 5 Drawing Sheets

(56) References Cited

U.S. PATENT DOCUMENTS

| | | | |
|---|---|---|---|
| 2012/0243480 A1* | 9/2012 | Zimmerman | H04Q 11/0478 370/328 |
| 2013/0058463 A1* | 3/2013 | Wahl | H04L 12/2878 379/9 |
| 2014/0123203 A1* | 5/2014 | Oliver | H04N 7/102 725/125 |
| 2014/0241724 A1* | 8/2014 | McGarry | H04Q 11/0067 398/67 |
| 2014/0328471 A1* | 11/2014 | Wahl | H04L 12/2878 379/27.01 |
| 2015/0026335 A1* | 1/2015 | Ladd | G06F 11/2268 709/224 |
| 2015/0280892 A1* | 10/2015 | Verbin | H04L 5/0007 370/294 |
| 2016/0112734 A1* | 4/2016 | Williams | H04H 20/78 725/118 |

* cited by examiner

SYSTEM AND METHOD OF ANALYZING CMTS DATA STREAMS

CROSS-REFERENCE TO RELATED APPLICATION

This application claims priority to U.S. Provisional Patent Application No. 62/291,454 filed on Feb. 4, 2016 and entitled SYSTEM AND METHOD OF ANALYZING CMTS DATA STREAMS, which application is incorporated herein by reference in its entirety.

FIELD OF THE DISCLOSURE

The present disclosure generally relates to communications network management and, more particularly but not exclusively, to rapidly identifying network fault sources in a communications network such as a cable television network or content distribution network.

BACKGROUND

Within the context of cable television systems, content distribution systems and other large networks, problems associated with customer premises equipment (CPE) such as intermittent connections and other faults may degrade network performance or cause fault conditions upstream from the CPE, resulting in a reduction in network quality of service. It is therefore important to rapidly identify network performance and/or fault conditions and the CPE potentially associated with such conditions.

SUMMARY

Various deficiencies in the prior art are addressed by systems, methods, architectures, mechanisms or apparatus for analyzing cable modem termination system (CMTS) streams by correlating anomalies found in full spectrum CMTS upstream data to changes in cable modem operational settings to identify and correct network fault conditions, model CMTS behavior, improve network performance and the like.

An apparatus according to one embodiment comprises a telemetry data capture device (TDCD), configured to receive subscriber data streams from a cable modem termination system (CMTS) and extract therefrom customer premises equipment (CPE), application and service telemetry data; and a computer implemented analytics services engine, operably coupled to the TDCD, and configured to correlate an indicator of degraded upstream operation to one or more subscriber data streams to identify thereby CPE associated with the indicated degraded upstream operation. In another embodiment, the computer implemented analytics services engine is further configured to correlate the indicator of degraded upstream operation to cable modem equalizer characterization values of one or more CPE to identify thereby CPE associated with the indicated degraded upstream operation.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various deficiencies in the prior art are addressed by systems, methods, architectures, mechanisms and apparatus for Real-Time Stream Capture, Ingestion, and Analytics to facilitate precision analytics embedded applications with very high sampling rates to provide predictive and prescriptive service management with minimal congestion or capacity disruption of cable modem terminations systems (CMTSs) and the like. Solutions according to the various embodiments may execute complex data transformation, conversion, tagging, and load/extract cycles at wire speeds without storage persistence.

In particular, various embodiments monitor CPE adaptive communication settings such as cable modem pre-distortion equalizer values to identify changes indicative of faults associated with CPE. These fault indicative changes to CPE adaptive communication settings are correlated to fault indicative data captured upstream from CPE aggregation points to identify thereby CPE associated with particular fault conditions and/or causing upstream QoS degradation.

Figure 1:
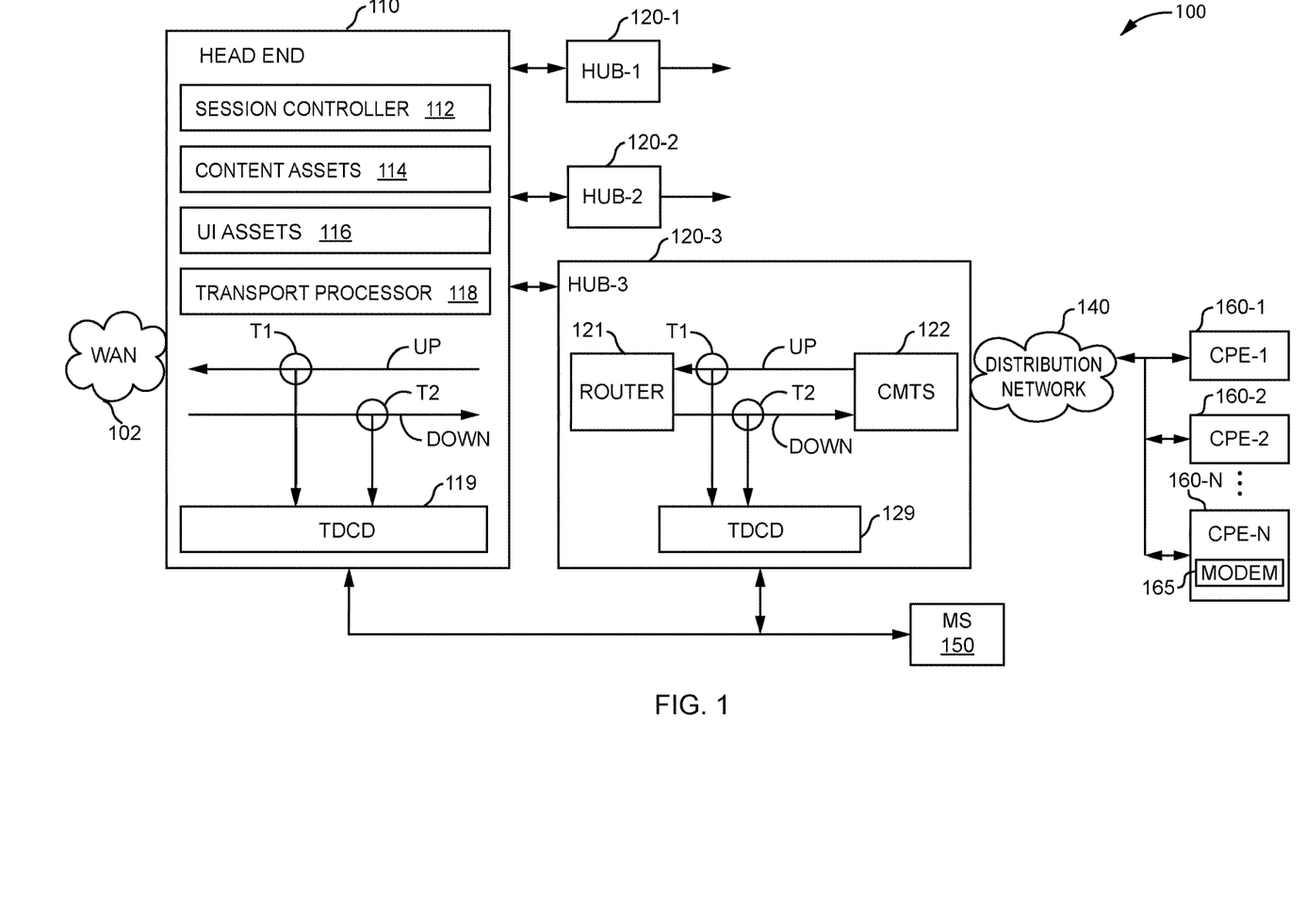
FIG. 1 depicts a high-level block diagram of a system benefiting from various embodiments.

FIG. 1 depicts a block diagram of a portion of a cable television system benefiting from various embodiments. Generally speaking, within a cable television system or other information distribution system, each of a plurality of residential or commercial subscribers uses customer premises equipment (CPE) such as DOCSIS-compliant cable modems and the like to access various network services such as Internet connectivity, streaming media, file sharing, document collaboration, voice over Internet protocol (VoIP) and so on. FIG. 1 does not depict other CPE elements such as video decoding/processing CPE used for receiving broadcast television.

Specifically, FIG. 1 depicts a cable television or content delivery system 100 comprising a head end 110 in communication with each a plurality of hubs 120 (illustratively three hubs denoted as 120-1 through 120-3), each communicating with a respective group of customer premises equipment (CPE) via a distribution network 140, illustratively a Hybrid Fiber Coax (HFC) for cable network, an optical network and the like. As depicted, hub 120-3 communicates with a group of CPE denoted as CPE 160-1 through 160-N.

In various embodiments, each hub 120 communicates with its respective CPE group 160 via a respective distribution network 140. In various embodiments, the distribution network 140 supports communications between multiple hubs 120 and CPE groups 160. In various embodiments, communications between head end 110 and one or more CPE groups 160 may be direct (i.e., without using a hub 120).

The head end 110 comprises, illustratively, a session controller 112, content asset module 114, user interface (UI) asset module 116 and a transport processor 118. Various other elements normally associated with a head end 110 are omitted for simplicity.

The session controller (or session manager) 112 generally operates to interact with CPE 160 to authenticate CPE to the service provider, establish a session between the head end and each CPE, determine subscriber authorization with respect to receiving content, content channels, network services and/or other provider supplied services at subscriber CPE, and cause the delivery of authorized services to subscriber CPE as appropriate. The session controller provides session control of the information flowing to and from content asset module 114 and UI asset module 116. The session controller 112 supports CPE 160 communications with service provider equipment such as head end 110, hub 120, MS 150 and/or other service provider equipment or third-party equipment.

Content asset module 114 stores content assets such as those associated with content to be broadcast or streamed to CPE, downloaded by CPE or otherwise delivered to CPE, such as video assets, audio assets, metadata, Digital rights management (DRM) information, encryption information and so on.

User interface (UI) asset module 116 stores UI assets such as those associated with electronic program guide (EPG) or other UI imagery and/or functionality invoked at subscriber CPE to enable subscriber interaction such as content selection, viewing/setting subscriber account parameters and so on.

Transport processor 118 combines or multiplexes content and/or UI asset data as needed to provide an output data stream for transmission to subscriber CPE via the distribution network 140. In various embodiments, the transport processor 118 performs transport packetizing functions for content and/or UI asset data as needed in conformance with the appropriate transport protocols associated with distribution network 140 and/or transport channels formed therethrough. In various embodiments, the transport processor 118 performs video encoding functions such as MPEG encoding or transcoding of content or UI assets.

As depicted herein, session controller 112 sends data, such as commands, encryption keys and the like to subscriber CPE 160 via the distribution network 140. Session controller 112 receives subscriber equipment data, such as information stream requests, session initiation data (set-top identification, capability, and the like), user clickstream information and/or other data from subscriber CPE 160 via the distribution network 140.

Subscribers within the system 100 utilize their respective CPE to receive various services. In particular, CPE 160 includes, inter alia, a modem 165 such as a DOCSIS compliant modem configured to communicate with a CMTS 122 of the respective hub 120 in support of various subscriber services such as Internet access, high speed data services (e.g., streaming media, media on demand, Internet access and the like), Voice over Internet Protocol (VoIP) in the like.

Modem 165 is configured to communicate with CMTS 122 via distribution network 140. Modem 165 performs various communication signal processing functions such as equalization, pre-distortion and the like. Each of the various communication signal processing functions is implemented by adapting various operating characteristics of the modem, which characteristics the be discerned by examining the settings associated with one or more of the communication signal processing functions. Generally speaking, these settings are adapted by modem 165 in response to changes in communication path conditions, signal quality and the like. In various embodiments, changes in such settings greater than a threshold amount of change are deemed to be indicative of a potential fault condition associated with the corresponding modem 165.

As depicted herein, a hub 120 (illustratively hub 120-3) includes a router 121 configured to receive downstream data from head end 110 and propagate upstream data toward head end 110. Further, the hub 120 includes a cable modem termination system (CMTS) 122 configured to propagate downstream data toward CPE 160 via distribution network 140, and receive upstream data from CPE 160 via distribution network 140.

The hub 120 is also depicted as including a telemetry data capture device (TDCD) 129 configured to receive data signals from the CMTS 122, such as via optical fiber taps (e.g., T1 and T2) implemented in a communications link (e.g., upstream optical link UP and downstream optical link DOWN) between the CMTS 122 and the router 121.

In various embodiments, the head end 110 includes a TDCD 119 configured to receive data signals from a CMTS (not shown) used to communicate directly with CPE 160, from aggregated CPE 160 such as provided via multiple hubs 120, or from sources of CPE upstream signal. As depicted in FIG. 1, head end 110 includes an upstream optical link UP for propagating upstream data from the hubs 120 and CPE 160 toward a wide area network (WAN) 102, and a downstream optical link DOWN for propagating downstream data toward the hubs 120 and CPE 160. The TDCD 119 operates in a manner substantially similar to that which will now be described with respect to TDCD 129 of hub 120.

The TDCD 129 (and 119 in various embodiments) is configured to extract telemetry data from the CMTS or other data signals received via optical fiber taps. Such telemetry data may include, illustratively, Internet Protocol Detail Records (IPDRs) and other information. The extracted telemetry data is communicated from the TDCD 129 (and 119 in various embodiments) to, illustratively, a management system (MS) 150 for further processing such as CPE fault detection/determination processing.

Each TDCD 129/119 is configured to passively tap HFC upstream data at full speed to extract therefrom IP Detail Record (IPDR) and full DOCSIS telemetry information pertaining to a plurality of CPEs for correlating external meta-data or full data for event, IP, video, telemetry and customer behavior for analytics data set population in real-time.

In various embodiments, a TDCD 129/119 may be implemented as a field programmable gate array device configured to capture data from the CMTS. Using the TDCD tap ports and interface to other machines in a very unique way. Configured and fiber tapped upstream from the CMTS, concentrators and other devices that are part of a cable network apparatus. Not just dropping into the system. Modifying the configuration of the TDCD device, not modifying the internal operations of the device.

Determination of the use to which extracted telemetry data is put may be adapted in real time for specific processing routines. Data may be passively received, and deep packet inspection employed, to identify object ID (OID), IP record data and the like to develop a services payload which may then be coupled with a network payload such as SNMP ID, MIPS and the like.

The TDCD 129 of hub 120 (and TDCD 119 of headend 110 if used) enables a noninvasive approach to large scale telemetry data ingestion and advanced action from the full network by passively tapping into the uplink side of the network aggregation points and polling end point devices directly rather than relying on aggregations from CMTSs. The TDCD induces negligible overhead by reaching through the CMTSs to control device polling of the endpoints and by capturing its data through passive observation of all other network and telemetry traffic. Many CMTSs may be scaled behind a single TDCD to discriminate between telemetry and general user traffic. This system may monitor blended internet traffic and telemetry data to provide clear visibility into the overall behavior of the network with specific device granularity in real-time. In this manner, the management system platform described herein enables the deployment of a new generation of advanced analytic based functionality for management of IP based networks.

The TDCD 129/119 supports a management platform having the following capabilities: Capture up to a thousand times more telemetry data than existing techniques for each network endpoint, including transients, without impacting existing infrastructure; increase polling frequency one hundred-fold to seconds sampling rates; automatically adjust to network activity to protect the cable plant; and integrate safely in production environments to manage devices, extend the life of the existing infrastructure, and enable new management capabilities.

For example, faults that can be detected in every CPE using full band spectrum analysis such as provided by TDCD 129/119 include those associated with: Reflections; Resonant Peaking; 4G LTE; FM Radio Ingress; RF Notches; Roll-off; Filters; and Adjacency.

Additional HFC plant impairments detectable through full spectrum data analysis include: Suck-outs, Notches, Resonance/Peaking and Roll offs, Tilt (and direction); Ripples/Waves, Distortion/Intermodal; Off-Air Ingress and Foreign carriers; Identifying if a filter is in place; Adjacency/Alignment from source (headend); and Surveillance for system's pilot carrier.

Other operational objectives which can be addressed through this analysis include: Characterizing the performance of RF spectrum using CPE (DOCSIS modems capable of Spectrum Capture), and identifying defects/faults in the plant network before customers experience them; Standardizing automation and detection, applying national Charter standards and prescribe to Field Operations tool sets; Monitoring variation over time and temperature to remove subjectivity and interpretation.

Generally speaking, the MS 150 is configured to interact with the head end 110, hubs 120 and other elements within the system 100 to configure various devices and/or services provided thereby, retrieve operational information and so on. In some embodiments the MS 150 is configured to interact directly with CPE 160. In some embodiments, the MS 150 is configured to interact indirectly with CPE 160, such as via a hub 120 or head end 110.

Figure 2:
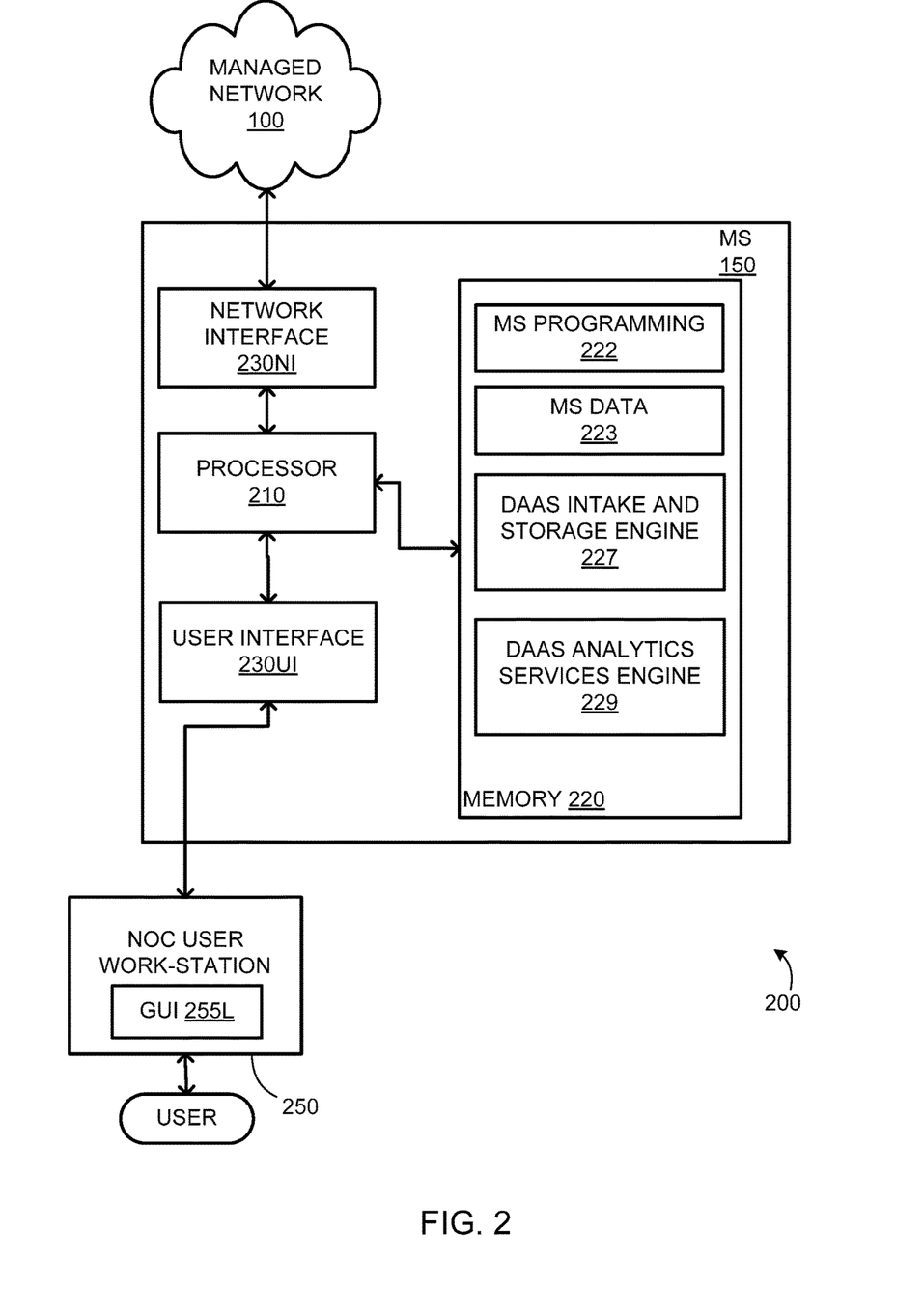
FIG. 2 depicts an exemplary management system suitable for use in the system of FIG. 1.

FIG. 2 depicts an exemplary management system suitable for use in the system of FIG. 1. As depicted in FIG. 2, MS 150 includes one or more processor(s) 210, a memory 220, a network interface 230N, and an optional user interface 230I. The processor(s) 210 is coupled to each of the memory 220, the network interface 230N, and the user interface 230I.

The processor(s) 210 is adapted to cooperate with the memory 220, the network interface 230N, the user interface 230I, and the support circuits 240 to provide various management functions for a data center 101 or the system 100 of FIG. 1.

The memory 220, generally speaking, stores programs, data, tools and the like that are adapted for use in providing various management functions for the data center and various associated elements as described herein with respect to the figures.

The memory 220 includes various management system (MS) programming modules 222 and MS databases 223 adapted to implement network management functionality such as discovering and maintaining network topology, correlating various elements and sub-elements, monitoring/processing network performance information and the like. The MS database 223 may also be used to store network topology information, network characteristic information, provider equipment (PE) operational and characteristic information, customer premises equipment (CPE) operational and characteristic information, services and applications information and so on.

The memory 220 includes a Data as a Service (DaaS) intake and storage engine (DISE) 227 operable to receive and store information captured by one or more of the telemetry data capture devices (TDCD) 119/129 discussed above with respect to FIG. 1. Further, data from individual network elements such as head end 110, hubs 120, CPE 160 and the like may also be retrieved from the respective network elements or intermediate network elements and stored for further processing. For example, local CPE information such as cable modem pre-distortion equalizer values for each of a plurality of CPE may be received and stored using the DaaS intake and storage engine 227. Similarly, upstream performance or operational information suitable for use in identifying upstream anomalies may also be received and stored using the DaaS intake and storage engine 227. Generally speaking, any such telemetry data may be stored within the context of a local database, remote data store unit (not shown) or other conventional data storage means.

The memory 220 includes a DaaS analytics and services engine (DASE) 229 operable to perform various analysis functions associated with received telemetry data and/or other information. For example, in various embodiments, CPE behavior indicative of intermittent connections and the like is periodically monitored and correlated to upstream degraded operation indicators (i.e., anomalies) to identify one or more CPE associated with the degraded operation indicator. Such upstream anomalies may comprise, illustratively, a noise burst in an upstream signal's spectrum, uncollectible forward error corrected (FEC) code words or other information, a change in signal-to-noise ratio (SNR) of an upstream signal and so on.

In various embodiments, the MS programming module 222, DISE 227 and DASE 229 are implemented using software instructions which may be executed by a processor (e.g., processor(s) 210) within one or more management or network elements, for performing the various management functions and other functions depicted and described herein.

The network interface 230NI is adapted to facilitate communications with various network elements, nodes and other entities within the system 100. The user interface 230UI is adapted to facilitate communications with one or more user workstations (illustratively, user workstation 250), for enabling one or more users to perform management functions for the system 100.

As described herein, memory 220 includes the MS programming module 222, MS databases 223, DISE 227 and DASE 229 which cooperate to provide the various functions depicted and described herein. Although primarily depicted and described herein with respect to specific functions being performed by rousing specific ones of the engines or databases of memory 220, it will be appreciated that any of the management functions depicted and described herein may be performed by using any one or more of the engines or databases of memory 320.

The MS programming 322 adapts the operation of the MS 190 to manage various network elements such as described above with respect to FIG. 1, as well as various other network elements (not shown) or various communication links therebetween. The MS databases 323 are used to store topology data, network element data, service related data, performance/operational data, protocol related data and any other data related to the operation of the MS 190 or system 100.

Various embodiments are directed to specific CPE associated with fault conditions impacting other CPE, provider equipment (PE), network services/applications and the like.

Figure 3:
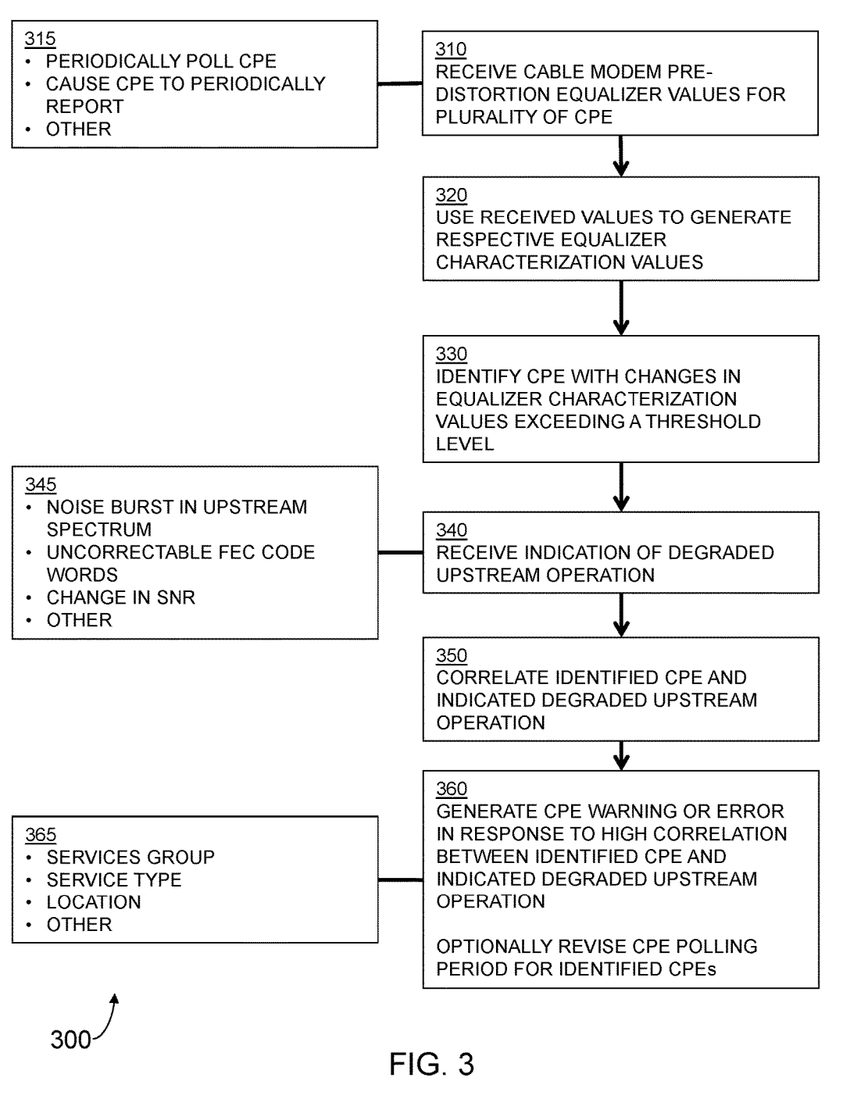
FIGS. 3-4 depict flow diagrams of methods according to various embodiments.

FIG. 3 depicts a method according to one embodiment. Specifically, FIG. 3 depicts a method 300 of identifying a physical location (e.g., CPE) associated with noises entering a network through improper connections, coaxial shield breaks and the like suitable for use in a system such as the MS 150 described above.

At step 310, cable modem pre-distortion equalizer values for each of a plurality of CPE are received. Referring to box 315, this information may be received by periodically polling CPE 160 to retrieve therefrom pre-distortion equalizer values associated with modem 165. Alternatively, CPE 160 may be caused to periodically report such information. Other mechanisms for retrieving this information may also be used. In various embodiments, a periodic polling or reporting time may comprise a day. Other polling the reporting times may also be selected, such as hourly polling/reporting.

At step 320, the received cable modem pre-distortion equalizer values are used to generate, for each modem, an equalizer characterization value. In various embodiments, the equalizer characterization value may comprise a numeric representation of the current equalizer setting indicative of the extent of pre-distortion necessary to receive useful signal. In various embodiments, the equalizer characterization value may comprise a main tap ratio (MTR) which comprises a ratio of energy and a main equalizer tap to energy and all other taps of the equalizer. Other techniques may also be used.

At step 330, the method identifies CPE associated with changes in equalizer characterization value exceeding a threshold level. The threshold level may be relatively course (e.g., twice that a prior value, half the size of the prior value) or relatively fine (e.g., a 10% difference, a 20% difference and so on).

At step 340, an upstream degraded operation indicator is received. Referring to box 345, such an degraded operation indicator may comprise an indication of a noise burst in upstream signal's spectrum, an indication of uncorrectable forward error corrected (FEC) code words or other information, an indication of a change in signal-to-noise ratio (SNR) of an upstream signal and so on.

At step 350, the identified CPE and upstream degraded operation indicator are correlated to determine one or more identified CPE which may be associated with the upstream degraded operation indicator. Such correlation may be based upon timestamps related to receive CPE data, upstream degraded operation indicators and the like. Step 350 may use any useful correlation criteria to assess whether a correlation between CPE (or and application or service at the CPE) and an upstream degraded operation indicator is, illustratively, very strong, strong, moderate or low. Each of these levels of correlation may result in respective determinations during subsequent analysis. Further, correlations may be iteratively performed across multiple criteria or data sets to identify very specific causation/correlation patterns.

At step 360, a CPE warning or error is generated in response to a high correlation between the one or more identified CPE and the upstream degraded operation indicator. The warning or error may identify a services group (e.g., streaming video, VoIP etc.), service type, location, and/or other information associated with the degraded operation indicator or fault condition and/or one or more CPE or CPE services associated with the degraded operation indicator or fault condition. The warning or error may be used by the MS 150 to reset the specific CPE, generate a service call and/or perform other functions directed to resolving a likely source of system noise such as via interconnection problems at the CPE. Optionally, a CPE polling period may be revised for identified CPEs, such as moving from a daily or hourly polling period to a polling period of 5 minutes or some other shorter period to effectively increase a polling rate of one or more CPE.

Steps 310-360 of the method 300 of FIG. 3 are repeated to enable rapid identification of CPE fault conditions associated with upstream anomalies.

Figure 4:
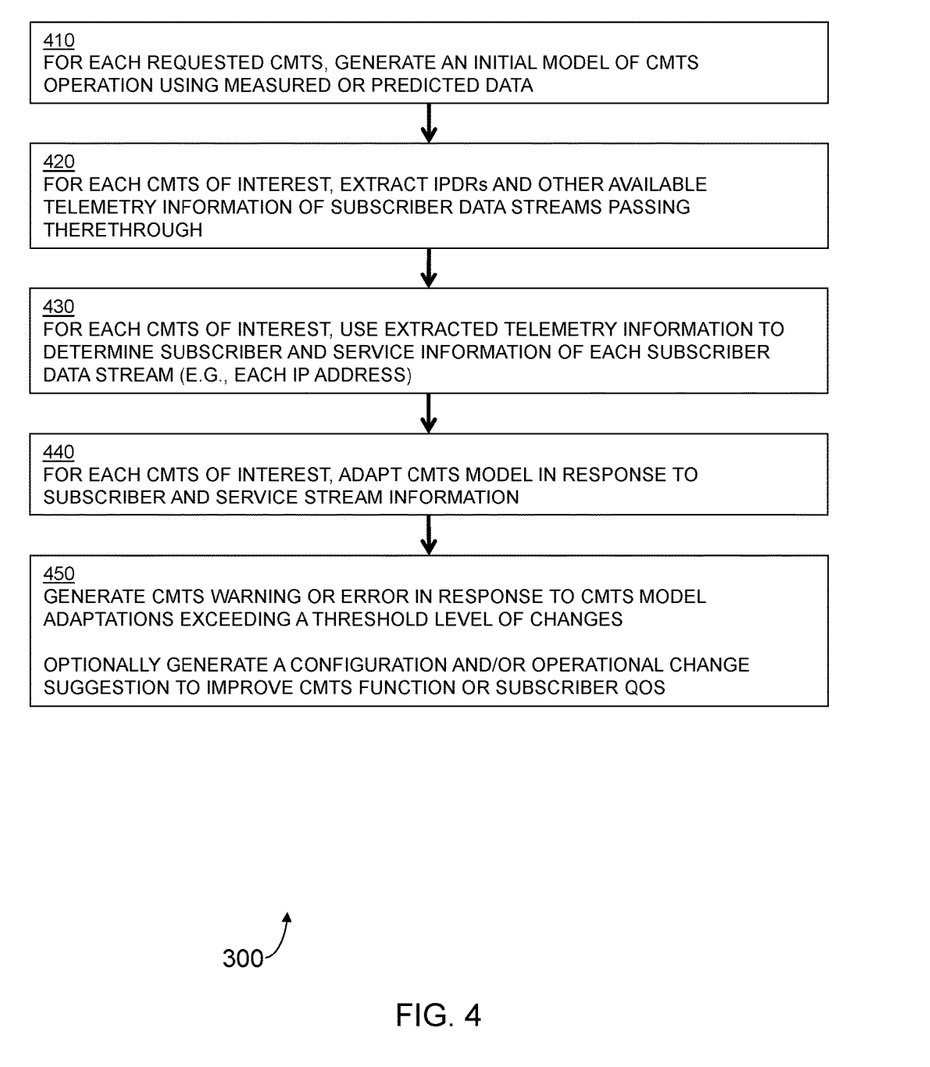

FIG. 4 depicts a method according to one embodiment. Specifically, FIG. 4 depicts a method 400 of managing a plurality of CMTS within a cable television network such as described above with respect to FIG. 1. The method 400 of FIG. 4 is suitable for use in a system such as the MS 150 described above.

At step 410, for each requested CMTS to be monitored within a network, generate an initial model of CMTS operation using measured or predicted data. The model may be relatively simple or very complex. The model may characterize CMTS operation and loading parameters to establish an operational baseline, the model may be adapted for particular types/number of subscribers, expected applications or services and so on.

The CMTS monitoring request may be received from network operations personal as part of network management, or received from a third party network provider interested in such monitoring as part of a Data as a Service offering. For example, the third party network provider may be a provider leasing capacity on a network managed by MS 150. The third party network provider may own/operate a separate network, wherein CMTS access is granted to MS 150 for the purpose of collecting and analyzing relevant CMTS information as part of a DaaS offering to the third party network provider.

At step 420, for each CMTS of interest, IPDRs and other available telemetry information associated with subscriber data streams passing through the CMTS are extracted by, illustratively, a respective TDCD.

At step 430, for each CMTS of interest, the extracted telemetry information is used to determine subscriber and service information associated with each subscriber data stream, illustratively according to each respective IP address.

At step 440, for each CMTS of interest, the respective CMTS model is adapted in response to, e.g., subscriber and service stream information. For example, the CMTS model may be adapted in response to increased congestion due to particular subscribers, particular service types or stream types, particular locations and so on.

At step 450, the method generates a warning or error in response to CMTS model adaptations exceeding a threshold level of changes for a CMTS of interest. Optionally, the method generates configuration and/or operational change suggestions to improve CMTS function or subscriber QoS.

Steps 420-450 of the method 400 of FIG. 4 are repeated to maintain a current model of each CMTS of interest.

The methods 300 and 400 described above may be used together to maintain status or model information associated with each CMTS in the network. In this way, decisions pertaining to CPE and/or service deployment may be made using the most up-to-date information pertaining to network capacity in operation. Further, various methods enable correlation between CPE fault conditions, upstream network anomalies, application and/or stream type associated faults or service degradations and so on.

Prescriptive Analytics

In various embodiments, one or more prescriptive analytics applications are run which read through the CMTS data with little or no congestion, and then perform prescriptive analytics on very specific DOCSIS type devices. This need not involve polling modems and receiving payloads, operations which processing and other burdens on a modem.

In various embodiments, all IPDR data is passively extracted from the tapped CMTS related data signals. An exploratory data analysis is then performed to identify that data having (or not having) correlation or causation values associated with some parameter of interest. In this manner, an intelligent hub apparatus may support multiple types of advanced analytics engines from supervising and supervised machine learning, to degraded operation detection/indication, to real-time ensemble predictive scoring, to models based on the need for running a proactive predictive network and so on. This may be used to form a predictive services management service.

As an example, consider the case of a customer frustrated with a Netflix over the top viewing experience. The IP address associated with the service or set-top boxes is captured and correlated at the DOCSIS level, and then correlated to an upstream services group to determine whether individual customer stream is associated with a detected upstream transient or outage (i.e., degraded upstream operation) during the time the Netflix application is served on a specific channel or screen. If the viewer of the application was unable to actually watch the desired program due to a network outage, then the system may reschedule the service, provide a discount for use of the service or provide some other automatic compensation to the customer.

The correlation aspect: based upon the retrieved data, at any given moment different data elements give rise to correlations to other data elements. The causation aspect: based on the retrieved data, all causation between all anomalies or changes in full some data may be easily attributed to other data such as data indicative of transient events, congestion, or whatever. These correlation and causation aspects are implemented within the context of repeatedly retrieving CMTS and CPE information, repeatedly performing various correlations, repeatedly adapting operating parameters and so on. In this manner, the various embodiments provide real-time modeling as well as a feedback loop providing real time management of the system components being modeled.

Thus, various embodiments provide a predictive service management function by extracting data in real-time and correlating this data to parameters of interest associated with system or subscriber quality of service (QoS) degradation. Further, various embodiments provide a customer experience assurance function by instructing data in real time and correlating this data to parameters of interest associated with subscriber QoS or quality of experience (QoE) degradation.

Various embodiments also find particular applicability within the context of an Internet of Things (IoT) deployment, where the number of IP addresses and IP payloads are so massive that there is an enormous latency or throughput issue when performing this kind of function. By using full spectrum monitoring of upstream data and correlating anomalies to specific streams or stream types, the problem space associated with identifying at fault CPE (or IoT monitor point) is greatly reduced.

The various embodiments improve data-to-decision or "decision latency" by supporting the extraction and analysis of massive amounts of deep data to make decisions at wire speed, while providing conversions, transforms, feature creation and management improvement at speed without impacting the actual performance of the network or changing the operation of the CMTS.

Within the context of a cable television deployment typical home has numerous IP addresses for gateway devices, set-top boxes, mobile devices and so on, along with various applications running on these platforms. Each IP address (whether associated with a device, application, service, monitored object or anything else) may provide upstream data that is captured by the TDCD and provided to the MS 150 for correlation to upstream network anomalies as appropriate, use in adapting CMTS models and other applications.

In one use case, hundreds of telemetry metrics are correlated with contemporaneous consumer services consumption, at enormous scale such as for multiple customers, to enable thereby predictive services management on a wide level. Various prescriptive analytics may be used. Generally speaking, a prescriptive analytic is where the captured data is processed to consider the best or appropriate next step (such as looking at what is going inside and outside a set top box).

Various embodiments contemplate a network management service wherein the addition of the embodiments to an existing network enables more accurate management of the network by more accurately understanding, responding to an otherwise managing data streams associated with the CMTS. For example, predictive algorithms may be run to generate data, which data is intercepted at the CMTS and used to analyze one or more predictors by, illustratively, an optimization engine and predictive engine to provide thereby improved modeling of parameters of interest.

Various embodiments utilize meta-data from CMTS streams generated by thousands of technicians in the field which flow through the system. In this manner, improved correlation and prediction is achieved with respect to parameters of interest. Data from these devices may be received from the devices directly or received via the processing of streams from the CMTS.

Various embodiments enable the creation of data in real or near real time at significant depth and breadth to provide a data set for analysis for particular applications.

Various embodiments contemplate a service-oriented interface or navigator accessed by service technicians, Network Systems operators and other management personnel instantiating such navigators as needed.

Various embodiments operate to capture, ingest and analyze CMTS upstream and downstream telemetry data without causing CMTS congestion. Various embodiments provide wire speed real time data transformation, conversion, and security masking for exploratory data analysis to prevent and reduce plant and premises service personnel dispatches, outages, trouble tickets and so on.

Figure 5:
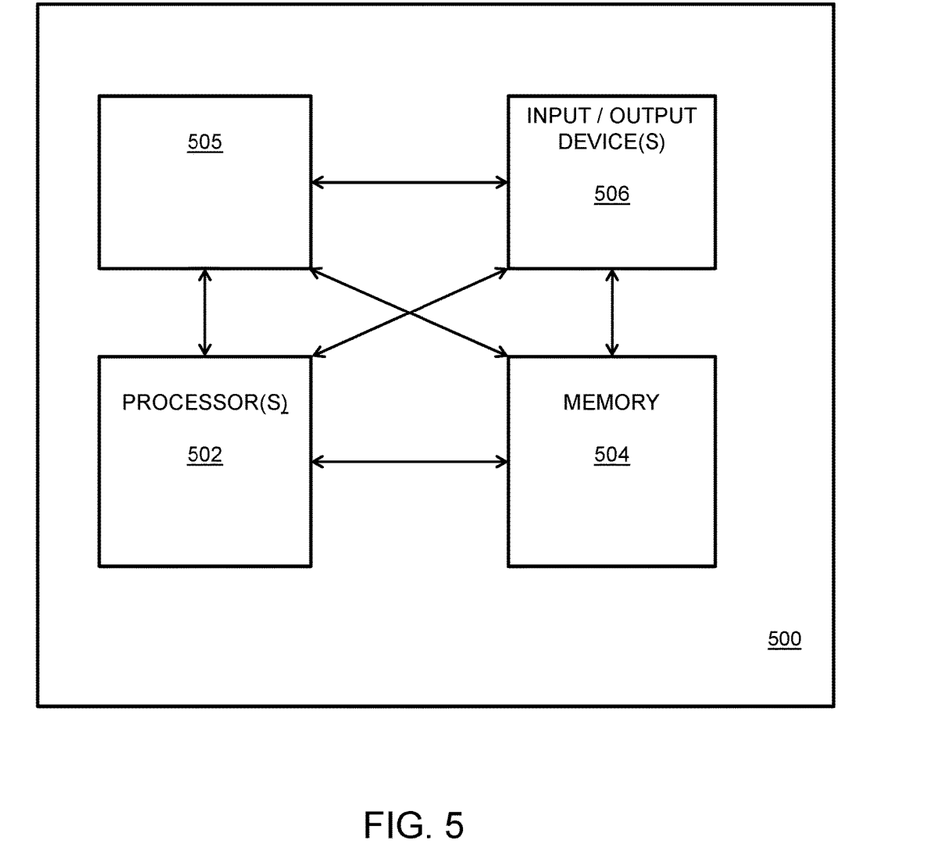
FIG. 5 depicts a high-level block diagram of a computing device suitable for use in performing the functions described herein.

FIG. 5 depicts a high-level block diagram of a computing device, such as a processor in a communications network element, suitable for use in performing functions described herein such as those associated with the various elements described herein with respect to the figures.

In particular, any of the various functional entities described herein, such as network routing entities, network management entities, server devices, client devices and so on within the communication network may be implemented in accordance with a general computing device structure such as described herein with respect to FIG. 5.

As depicted in FIG. 5, computing device 500 includes a processor element 503 (e.g., a central processing unit (CPU) or other suitable processor(s)), a memory 504 (e.g., random access memory (RAM), read only memory (ROM), and the like), a cooperating module/process 505, and various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware or in a combination of software and hardware, e.g., using a general purpose computer, one or more application specific integrated circuits (ASIC), or any other hardware equivalents. In one embodiment, the cooperating process 505 can be loaded into memory 504 and executed by processor 503 to implement the functions as discussed herein. Thus, cooperating process 505 (including associated data structures) can be stored on a computer readable storage medium, e.g., RAM memory, magnetic or optical drive or diskette, and the like.

It will be appreciated that computing device 500 depicted in FIG. 5 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. An apparatus, comprising:
a telemetry data capture device (TDCD), configured to receive passively tapped optical signal including subscriber data streams from a cable modem termination system (CMTS) and extract therefrom customer premises equipment (CPE), application and service telemetry data from a plurality of CPE; and
a computer implemented analytics services engine, operably coupled to the TDCD, and configured to correlate an indicator of degraded operation to CPE adaptive communications settings indicative of CPE faults to identify thereby CPE, within the plurality of CPE, associated with the indicated degraded operation, to adapt an operational model of said CMTS in response to said extracted telemetry information, said operational model comprising a plurality of CMTS operational parameters associated with respective parameter value ranges indicative of a nominal CMTS operational state, and to generate a warning in response to CMTS model adaptations exceeding a threshold value.

2. The apparatus of claim 1, wherein said CPE adaptive communications settings comprise cable modem equalizer characterization values of CPE within the plurality of CPE.

3. The apparatus of claim 2, wherein said cable modem equalizer characterization values are generated using cable modem pre-distortion equalizer values.

4. The apparatus of claim 1, wherein the telemetry data comprises Internet Protocol Detail Records (IPDRs) extracted from the tapped optical signal associated with the CMTS, and the computer implemented analytics services engine is further configured to identify data having correlation with a parameter of interest.

5. The apparatus of claim 1, wherein said degraded operation comprises at least one of a noise burst in upstream spectrum, uncorrectable forward error corrected code words, and a change in signal to noise ratio in upstream spectrum.

6. The apparatus of claim 1, wherein said computer implemented analytics services engine is further configured to generate a CPE warning in response to a high correlation between identified CPE and said indicator of degraded operation.

7. The apparatus of claim 1, wherein the TDCD comprises a field programmable gate array (FPGA).

8. A method, comprising:
  receiving, from a telemetry data capture device (TDCD), passively tapped optical signal including subscriber data streams from a cable modem termination system (CMTS) and extracting therefrom customer premises equipment (CPE), application and service telemetry data from a plurality of CPE; and
  by a computer implemented analytics services engine, operably coupled to the TDCD, correlating an indicator of degraded operation to CPE adaptive communications settings indicative of CPE faults to identify thereby CPE, within the plurality of CPE, associated with the indicated degraded operation, adapting an operational model of said CMTS in response to said extracted telemetry information, said operational model comprising a plurality of CMTS operational parameters associated with respective parameter value ranges indicative of a nominal CMTS operational state, and generating a warning in response to CMTS model adaptations exceeding a threshold value.

9. The method of claim 8, wherein said CPE adaptive communications settings comprise cable modem equalizer characterization values of CPE within the plurality of CPE.

10. The method of claim 9, wherein said cable modem equalizer characterization values of CPE within the plurality of CPE are generated using periodically retrieved data from said plurality of CPE.

11. The method of claim 9, further comprising selectively increasing a rate of polling of said plurality of CPE to retrieve said data from said plurality of CPE.

12. The method of claim 8, wherein said CMTS comprises a CMTS identified in a received CMTS monitoring request.

13. A tangible and non-transitory computer readable storage medium storing instructions which, when executed by a computer, adapt the operation of the computer to:
  receive, from a telemetry data capture device (TDCD), passively tapped optical signal including subscriber data streams from a cable modem termination system (CMTS) and extract therefrom customer premises equipment (CPE), application and service telemetry data from a plurality of CPE; and
  by a computer implemented analytics services engine, operably coupled to the TDCD, correlate an indicator of degraded operation to CPE adaptive communications settings indicative of CPE faults to identify thereby CPE, within the plurality of CPE, associated with the indicated degraded operation, adapting an operational model of said CMTS in response to said extracted telemetry information, said operational model comprising a plurality of CMTS operational parameters associated with respective parameter value ranges indicative of a nominal CMTS operational state, and generating a warning in response to CMTS model adaptations exceeding a threshold value.

14. The apparatus of claim 1, further comprising:
  one or more optical fiber taps, each tap configured to direct toward said TDCD a portion of a respective upstream optical link signal including subscriber data streams associated with a respective CMTS.

15. The apparatus of claim 14, wherein each respective upstream optical link signal is associated with a respective CMTS within a system comprising a plurality of hubs, where each hub includes at least one respective CMTS.

16. The apparatus of claim 15, wherein:
  the TDCD is configured to repeatedly process the passively tapped optical signal to extract therefrom CPE, application and service telemetry data from a plurality of CPE;
  the computer implemented analytics services engine is configured to build a real-time model of system components including at least CPE in response to indications of degraded operation, correlations of CPE to indications of degraded operation, and any of the repeatedly extracted CPE, application and service telemetry data.

17. The apparatus of claim 15, wherein:
  the TDCD is configured to repeatedly process the passively tapped optical signal to extract therefrom CPE, application and service telemetry data from a plurality of CPE;
  the computer implemented analytics services engine is configured to correlate a plurality of extracted telemetry metrics with contemporaneous consumer services consumption to enable thereby a predictive services management of the system.

18. The apparatus of claim 1, further comprising:
  one or more optical fiber taps, each tap configured to direct toward said TDCD a portion of a respective downstream optical link signal including subscriber data streams associated with a respective CMTS;
  said TDCD further extracting from each respective downstream optical link signal respective CPE, application and service telemetry data.

* * * * *